United States Patent [19]

Tamura et al.

[11] 4,308,578

[45] Dec. 29, 1981

[54] INVERTER DEVICE

[75] Inventors: Yoshimoto Tamura; Hidehiko Sugimoto, both of Nagoya, Japan

[73] Assignee: Mitsubishi Denki Kabushiki Kaisha, Tokyo, Japan

[21] Appl. No.: 138,897

[22] Filed: Apr. 10, 1980

[30] Foreign Application Priority Data

Apr. 17, 1979 [JP] Japan ................................. 54-47096

[51] Int. Cl.³ .......................................... H02M 7/515
[52] U.S. Cl. ..................................... 363/138; 363/96; 307/252 C
[58] Field of Search ............... 363/135, 136, 137, 138, 363/96–98; 307/252 C, 252 M, 252 P

[56] References Cited

U.S. PATENT DOCUMENTS

| | | | |
|---|---|---|---|
| 3,555,397 | 1/1971 | Frank | 363/138 |
| 3,559,034 | 1/1971 | Jensen et al. | 363/135 |
| 3,688,182 | 8/1972 | Johnson | 363/138 |
| 4,146,921 | 3/1979 | Akamatsu | 363/138 |

*Primary Examiner*—William M. Shoop
*Assistant Examiner*—Peter S. Wong
*Attorney, Agent, or Firm*—Oblon, Fisher, Spivak, McClelland & Maier

[57] ABSTRACT

An inverter device for converting DC to AC by using thyristors as switching elements comprises a commutation circuit for turn-off of the thyristors which is formed by a serial connection of an auxiliary power source, a gate control thyristor and a thyristor which is commonly used and connected to a thyristor used as the switching element which is turned off by applying a reverse voltage by turning on the gate control thyristor and the thyristor of the commutation circuit.

7 Claims, 6 Drawing Figures

INVERTER DEVICE

BACKGROUND OF THE INVENTION

The present invention relates to an inverter device for converting a direct current into an alternating current.

Heretofore, an inverter device shown in FIG. 1 has been known. In FIG. 1, the reference numeral (1) designates a DC power source; (2U+), (2V+), (2W+), (2U−), (2V−) and (2W−1) respectively designate transistor; (3U+), (3V+), (3W+), (3U−), (3V−) and (3W−) respectively designate diodes. The transistor and diode (2U+), (3U+); (2V+), (3V+); (2W+), (3W+); (2U−), (3U−); (2V−), (3V−) and (2W−), (3W−) are respectively connected in reversely parallel. The transistors (2U+), (2U−); (2V+), (2V−) and (2W+), (2W−) are respectively connected in series. The collectors of the transistors (2U+), (2V+), (2W+) are connected to a positive terminal of a power source (1) and the emitters of the transistors (2U−), (2V−), (2W−) are connected to a negative terminal of the power source (1). The reference (4) designates a load three terminals (U), (V), (W) of which are respectively connected to a joint of the transistor (2U+) and the transistor (2U−); a joint of the transistor (2V+) and the transistor (2V−); and a joint of the transistor (2W+) and the transistor (2W−). The bases of the transistors (2U+), (2V+), (2W+), (2U−), (2V−), (2W−) are respectively connected to the base controller (5). During the period shown in FIG. 2, the base signal is controlled so as to provide phase shifts for each 120° in the transistors (2U+), (2V+), (2W+); and for each 180° between the transistors (2U+), (2U−); (2V+), (2V−); and (2W+), (2W−) and to turn on for 180°, respectively.

When the base signal is input into the base of the transistor, the voltage shown in FIG. 3 is applied between the terminals of the load (4). The voltage of the power source (1) is shown as Ed. During the period of (I) of FIG. 2, the transistors (2U+), (2W+), (2V−) are turned on whereby a voltage Ed is applied between (U)−(V); a voltage −Ed is applied between (V)−(W) and a voltage 0 is applied between (W)−(U). This corresponds to (I) in FIG. 3. Thus, the AC is fed from the DC power source (1) to the load (4).

The diodes (3U+), (3V+), (3W+), (3U−), (3V−), (3W−) are required for forming passage capable of passing the current in the direction of the currents of the transistors which have been turned off, even though the transistors (2U+), (2V+), (2W+), (2U−), (2V−), (2W−) are turned off in the case of the induction load (4). That is, for example, when the transistor (2U+) is turned off, the diode (3U−) passes the current which has been passed through the transistor (2U+). The diode (3U−) is turned on and the potential of the terminal (U) is the same as that of the turn-on of the transistor (2U−). The voltage waveform shown in FIG. 3 is not changed.

In the inverter shown in FIG. 1, the transistors are used for the switching elements. The transistors are expensive in comparison with a thyristor etc. as another element having the same current capacity. Thus, the thyristor does not turn-off even though the gate signal is stopped. Therefore, the inverter device shown in FIG. 1 does not operate in the normal state only when the transistor is replaced to the thyristor. When the transistor is replaced to the thyristor, as it is well known, a commutation circuit is required.

SUMMARY OF THE INVENTION

The present invention is to provide an economical inverter device in which transistors of the inverter device shown in FIG. 1 are replaced to thyristors and control devices such as gate control thyristors can be used for turning off the thyristors.

The present invention is to provide an economical inverter in which a serial gate control thyristor comprising a DC power source, a gate control thyristor and a thyristor which is commonly connected in parallel to a main thyristor which is turned off, and a reverse voltage is applied to the thyristor being turned off by turning on the other thyristor so as to decrease number of transistors which are more expensive than that of a thyristor.

DESCRIPTION OF THE PREFERRED EMBODIMENT

Figure 1:
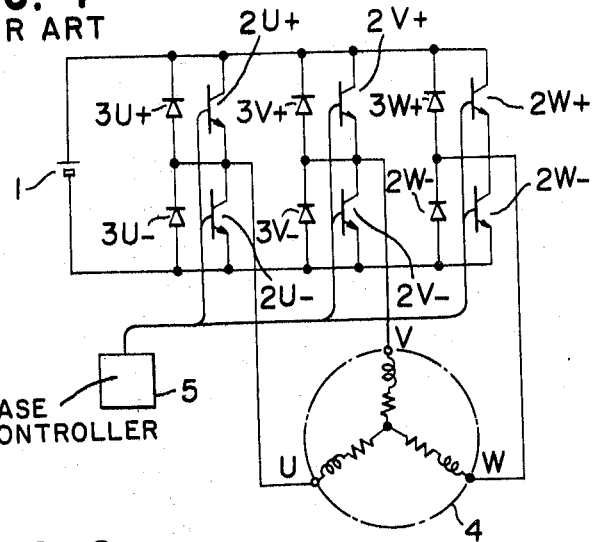
FIG. 1 is a circuit diagram of a conventional inverter device.
Figure 2:
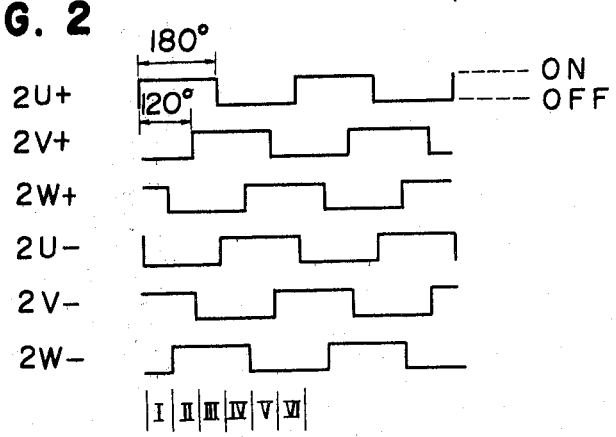
FIG. 2 shows waveforms of base input signals of transistors in the inverter device shown in FIG. 1.
Figure 3:
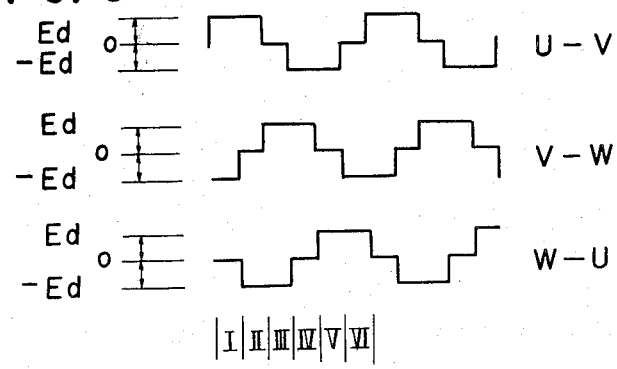
FIG. 3 shows waveforms of output voltages of the inverter shown in FIG. 1.
Figure 4:
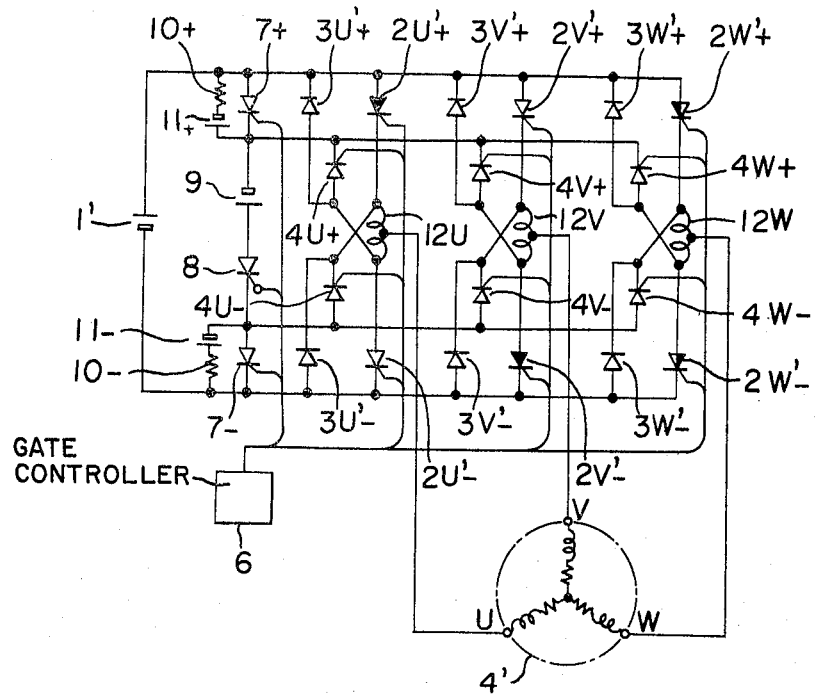
FIG. 4 is a circuit diagram of the inverter device of the present invention.

Referring to FIG. 4, one embodiment of the present invention will be described.

In FIG. 4, the reference numeral (1') designates a first DC power source (voltage: Ed); (2U'+), (2V'+), (2W'+), (2U'−), (2V'−), (2W'−) respectively designate thyristors for forming a serial connection of thyristors (three pairs in FIG. 4); (3U'+), (3V'+), (3W'+), (3U'−), (3V'−), (3W'−) respectively designate rectifiers (diodes in this case); (4') designates a load and terminals of the load are respectively connected to joints of the serial connection of thyristors; (4U+), (4V+), (4W+), (4U−), (4V−), (4W−) respectively designate thyristors; and (7+), (7−) respectively designate thyristors; and the thyristors (4U+), (4V+), (4W+), (4U−), (4V−), (4W−), (7+), (7−) form a thyristor group; (8) designates a gate control thyristor (hereinafter referring to as GTO); (9) designates a DC power (voltage: Ec); and a second power source is formed by the GTO (8) and the DC power source (9); (10+), (10−) respectively designate resistors; (11+), (11−) respectively designate a third DC power source and (12U), (12V), (12W) respectively designate reactors.

A group of the thyristor (2U'+) and the reactor (12U) and the thyristor (2U'−); a group of the thyristor (2V'+) and the reactor (12V) and the thyristor (2V'−); and a group of the thyristor (2W'−) and the reactor (12W) and the thyristor (2W'−) are respectively connected in series to provide the current directions shown in FIG. 4. The positive sides of the serial connections {anodes of the thyristors (2U'+), (2V'+), (2W'+)} are respectively connected to the positive terminal of the power source (1'). The negative sides of the serial connections {cathodes of the thyristors (2U'−), (2V'−), (2W'−)} are respectively connected to the negative terminal of the power source (1').

The positive terminal of the power source (9) is connected to the anode of the GTO (8) and the negative terminal of the power source (9) is connected to the cathode of the thyristor (7+) and the cathode of GTO (8) is connected in series to the anode of the thyristor (7−).

The anode of the thyristor (7+) is connected to the positive terminal of the power source (1'), and the cathode of the thyristor (7−) is connected to the negative terminal of the power source (1').

The anodes of the diode (3U'+) and the thyristor (4U+), the anodes of the diode (3V'+) and the thyristor (4V+) and the anodes of the diode (3W'+) and the thyristor (4W+) are respectively connected to the joint of the reactor (12U) and the thyristor (2U'−), the joint of the reactor (12V) and the thyristor (2V'−) and the joint of the reactor (12W) and the thyristor (2W'−). The cathodes of the diodes (3U'+), (3V'+), (3W'+) are connected to the positive terminal of the power source (1'). The cathodes of the thyristors (4U+), (4V+), (4W+) are connected to the joint of the thyristor (7) and the power source (9).

In the same manner, the cathodes of the diode (3U'−) and the thyristor (4U−), the cathodes of the diode (3V'−) and the thyristor (4V−) and the cathodes of the diode (3W'−) and the thyristor (4W−) are respectively connected to the joint of the thyristor (2U'+) and the reactor (12U), the joint of the thyristor (2V'+) and the reactor (12V) and the joint of the thyristor (2W'+) and the reactor (12W). The cathodes of the diodes (3U'−), (3V'−), (3W'−) are connected to the negative terminal of the power source (1') and the anodes of the thyristors (4U−), (4V−), (4W−) are connected to the joint of the GTO (8) and the thyristor (7−).

The resistor (10+) and the power source (11+) are connected in series. The reverse terminal of the resistor (10+) which is not connected to the power source (11+) is connected to the positive terminal of the power source (1'). The positive terminal of the power source (11+) is connected to the cathode of the thyristor (7+). The power source (11−) is connected in series to the resistor (10−). The reverse terminal of the resistor (10−) which is not connected to the power source (11−), is connected to the negative terminal of the power source (1'). The negative terminal of the power source (11−) is connected to the anode of the thyristor (7−).

The neutral points of the reactor (12U), (12V), (12W) are respectively connected to the terminals (U), (V), (W). The gates of the thyristors (2U'+), (2V'+), ... (2W'−) and the thyristors (4U'+), (4V'+), ... (4W'−) and the thyristors (7+), (7−) and GTO (8) are connected to a gate controller (6).

Figure 5:
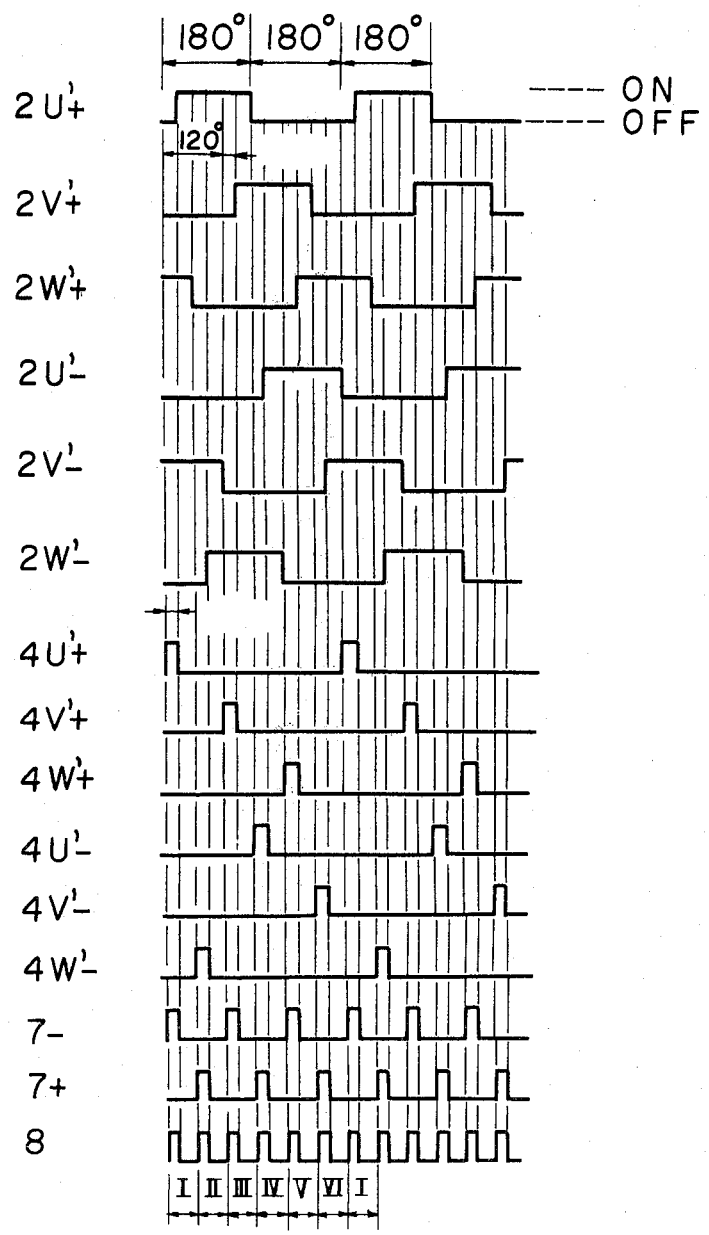
FIG. 5 shows waveforms of gate signals of thyristors and a gate control thyristor in the inverter device shown in FIG. 4.

The inverter device having the above-mentioned structure is operated as follows. The gate signals shown in FIG. 5 are input from the gate controller (6) into the thyristors (2U'+), (2V'+), ... (2W'−) and the thyristors (4U'+), (4V'+) ... (4W'−) and the thyristors (7+), (7−) and GTO (8). That is, the gate signals are fed into the thyristors (2U'+), (2V'+), (2W'+) in each phase shift of 180° and fed into the thyristors (2U'+), (U'−); the thyristors (2V'+), (2V'−) and the thyristors (2W'+), (2W'−) respectively in each phase shift of 120°, for the period given by subtracting about 50 μsec. from 180°. The period of about 50 μsec. is the period for turning on GTO (8) and either the thyristor (7+) or (7−); and turning on one of the thyristors (4U'+), (4V'+), ... (4W'−) by turning off one of the thyristors (2U'+), (2V'+), ... (2W'−).

The time for feeding the gate signal into GTO (8) is to turn-off the thyristors (2U'+), (2V'+), ... (2W'−). The time for feeding the gate signal into the thyristor (7+) is to turn-off the thyristors (2U'+), (2V'+), (2W'+); the time for feeding the gate signal into the thyristor (7−) is to turn-off the thyristors (2U'−), (2V'−), (2W'−). The time for feeding the gate signal to the thyristors (4U'−), (4V'−), (4W'−) is to turn-off the thyristors (2U'+), (2V'+), (2W'+). The time for feeding the gate signal into the thyristors (4U'+), (4V'+), (4W'+) is to turn-off the thyristors (2U'−), (2V'−), (2W'−).

The operation from the period (I) to the period (II) shown in FIG. 5 will be described.

In the period (I) when the gate signal is not fed into the thyristor (4U'+), the thyristor (7−) and GTO (8), the gate signals are fed into the thyristors (2U'+), (2W'+), (2V'−), and accordingly, the potential Ed of the power source (1') is given to the terminals (U),(W) of the load (4') and zero potential is given to the terminal (V) of the power source (1'). The reactors (12U), (12V), (12W) have only about several tens to hundred μH which are relatively smaller than the impedances of the load (4) whereby the voltage drop can be negligible.

In the transition from the period (I) to the period (II), the gate signal of the thyristor (2W'+) is stopped, but the gate signals are fed into the gates of the thyristors (2U'+), (2V'−) and the gates of the thyristors (4W'−), (7+) and GTO (8) for about 50 μsec. in the initial period whereby the potential of the power source (9) is applied to the thyristor (2W'+) as a reverse voltage through the circuit of GTO (8)—thyristor (4W'−)—thyristor (2W'+)—thyristor (7+) and accordingly the thyristor (2W'+) is turned off. The power source (9) is to turn-off the thyristors (2U'+), (2V'+), ... (2W'−) in such manner and accordingly, it is enough to apply only several to several tens volts.

The potentials at the terminals (U), (V), (W) of the load (4') are as follows.
  Potential at (U) Ed
  Potential at (V) 0
  Potential at (W) Ed +(Ec/2).

When the gate signals of the thyristors (4W'−), (7+) and GTO (8) are stopped, but the gate signals are fed into the thyristors (2U'+), (2V'−), (2W'−), the potential of the terminals (U) of the load (4) is Ed and the potentials of the terminals (V), (W) of the load (4) are zero. When the gate signals of the thyristors (4W'−), (7+) and GTO (8) are stopped, GTO (8) is immediately turned off to be zero of the current to the thyristor (4W'−) and GTO (8). Thus, a thyristor has a turn-off time from the stop of the current to maintain the OFF function if a reverse voltage is not applied. Therefore, the reverse voltage is applied by the power source (11+), (11−). The voltage of the power source (11+) is applied as a reverse voltage to the thyristor (7+) by the circuit including the resistor (10+). The voltage of the power source (11−) is applied as a reverse voltage from the positive terminal through the resistor (10−) and the diode (3W−) to the cathode of the thyristor (4W'−). The power source (11+), (11−) can be about 10 volt. When both GTO (8) and the thyristor (7−) are in ON state, the voltages of the power sources (1'), (11+), (9) are applied to the resistor (10+). When both GTO (8) and the thyristor (7+) are in ON state, the voltages of the power sources (1'), (11−), (9) are applied to the resistor (10−). Therefore, the resistors (10+), (10−) are preferably several hundreds Ω.

Figure 6:
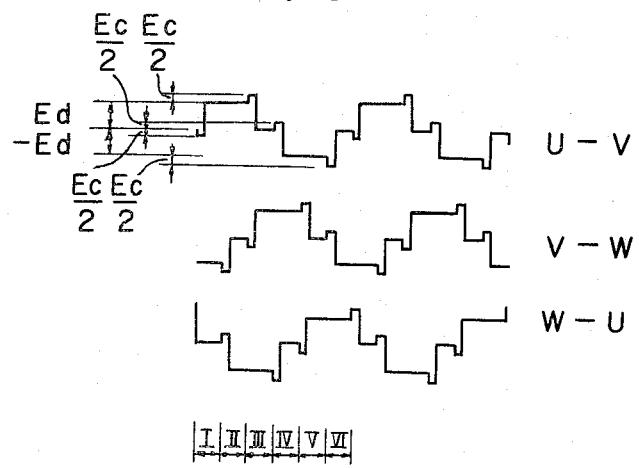
FIG. 6 shows waveforms of output voltages of the inverter device shown in FIG. 4.

In the transitions from the period (II) to the period (III), the same operation is considered. Therefore, it is not repeated. The potentials of the terminals (U), (V), (W) of the load (4) are shown in FIG. 6.

In the embodiment of FIG. 4, only each one of thyristors (thyristors (7+), (7−) is respectively used in parallel connection to the serial connection of thyristors, so as to connect to the positive terminal of the serial connection of thyristors (anodes of thyristors (2U'+), (2V'+), (2W'+)) and the negative terminal of the serial connection of thyristors (cathodes of thyristors (2U'−), (2V'−), (2W'−)). Therefore, the number of the thyristors can be decreased.

The third DC power source (11+), (11−) is used not only for turn-off of the thyristors (7+), (7−), but also used for turn-off of the other thyristors (4U+), (4V+), (4W+), . . . (4W−). Therefore, number of the power sources required for turn-off of the thyristors. That is, the thyristors (4U+), (4V+), . . . (4W−) are respectively connected to the terminals of the rectifier elements (diodes (3U'+), (3V'+), . . . (3W'−)) for connecting to the serial connection of thyristors, whereby the third power source (11+), (11−) can be used for turn-on of the thyristors (4U+), (4V+), . . . (4W−).

In the embodiment, the structure and the operation of the three phase full wave circuit has been described. Thus, the single phase circuit can be considered in the same manner. The similar effect can be attained by replacing the gate control thyristor (GTO) to the other switching element such as a transistor.

What is claimed is:

1. An inverter device which comprises a first DC power source;
   a serial connection of thyristors connected in parallel in forward direction between the positive and negative terminals of said first DC power source;
   a load whose terminal are respectively connected to middle parts of said serial connection of thyristors;
   a controller for feeding signals in a predetermined order for predetermined periods to said thyristors of said serial connection of thyristors, so that the output of said serial connection of thyristors to said load approximates an AC power source;
   rectifier elements which are respectively connected between said first DC power source and middle terminals of said thyristors of said serial connection of thyristors to shunt induced electromotive force resulted by said load;
   a second DC power source which is controlled by said controller to output for a predetermined period by synchronizing to a signal for forming the AC power, when said signal is fed by said controller;
   a group of thyristors which are connected to both terminals of said second DC power source and which are controlled by said controller to connect in reverse polarity to thyristors which are switched from ON state to OFF state of the thyristors of said serial connection of thyristors; and
   a third DC power source which is connected in reverse polarity directly to one terminal of each thyristor of said group of thyristors.

2. An inverter device according to claim 1 wherein said serial connection of thyristors has two thyristors.

3. An inverter device according to claim 2 wherein said group of thyristors comprises a thyristor for connecting the positive terminal of said second DC power source to the negative terminal of said serial connection of thyristors; a thyristor for connecting the negative terminal of said second power source to the middle part of said serial connection of thyristors; a thyristor for connecting the positive terminal of said second power source to the middle part of said serial connection of thyristors; and a thyristor for connecting the negative terminal of said second power source to the positive terminal of said serial connection of thyristors.

4. An inverter device according to claim 2 wherein said group of thyristors comprises a thyristor for connecting the positive terminal of said second DC power source to the negative terminal of said serial connection of thyristors; a thyristor for connecting the negative terminal of said second power source to the middle part of said serial connection of thyristors; a thyristor for connecting the positive terminal of said second power source to the middle part of said serial connection of thyristors; and a thyristor for connecting the negative terminal of said second power source to the positive terminal of said serial connection of thyristors and only one thyristor is used for connecting the positive terminal of said second DC power source to the negative terminal of said serial connection of thyristors; and only one thyristor is used for connecting the negative terminal of said second power source to the positive terminal of said serial connection of thyristors; and thyristors as the same number of said serial connection of thyristors, are used for connecting the positive terminal of said second DC power source to the middle part of said serial connection of thyristors; and thyristors as the same number of said serial connection of thyristors, are used for connecting the negative terminal of said second power source to the middle part of said serial connection of thyristors.

5. An inverter device according to claim 4 wherein said third DC power source is connected in parallel to said thyristor for connecting the positive terminal of said second DC power source to the negative terminal of said serial connection of thyristors; and also connected in parallel to said thyristor for connecting the negative terminal of said second power source to the positive terminal of said serial connection of thyristors.

6. An inverter device according to claim 1 wherein said second DC power source is formed by a serial connection of a switching element which is controlled by said controller for turn-on and off and said second DC power source.

7. An inverter device according to claim 6 wherein said switching element controlled by said controller is a gate turn-off thyristor.

* * * * *